United States Patent [19]

Thomassen

[11] Patent Number: 5,460,644
[45] Date of Patent: Oct. 24, 1995

[54] STAIN-BLOCKING AND MILDEWCIDE RESISTANT COATING COMPOSITIONS

[75] Inventor: Ivar P. Thomassen, South Bend, Ind.

[73] Assignee: The O'Brien Corporation, South Bend, Ind.

[21] Appl. No.: 166,692

[22] Filed: Dec. 14, 1993

[51] Int. Cl.[6] .................. C09D 5/00; C08K 3/10
[52] U.S. Cl. .................. 106/18.32; 106/15.05; 106/18.36; 523/122; 524/395; 524/428
[58] Field of Search ................ 106/15.05, 18.36, 106/18.32; 514/494; 424/641; 523/122; 524/395, 399, 428, 434

[56] References Cited

U.S. PATENT DOCUMENTS

| | | | |
|---|---|---|---|
| 3,959,237 | 5/1976 | Blank | 525/330.2 |
| 4,018,594 | 4/1977 | Blank | 504/116 |
| 4,571,415 | 2/1986 | Jordan, Jr. | 524/428 |
| 4,623,692 | 11/1986 | Hansen | 524/549 |
| 4,707,297 | 11/1987 | Paske, Jr. et al. | 106/8 |
| 4,782,109 | 11/1988 | Dulaney et al. | 524/501 |
| 5,149,729 | 9/1992 | Englund | 524/366 |

Primary Examiner—Anthony Green
Attorney, Agent, or Firm—Emrich & Dithmar

[57] ABSTRACT

A stain-blocking, mildewcide and biocide resistant aqueous coating compositions containing synthetic or natural polymer includes a soluble zinc ammonium complex. The zinc ammonium complex has the formula $$Zn(NH_3)^{+2}{}_n \cdot X \cdot H_2O$$

where n is a number from 4 to 6 and X is selected from a group consisting of acetate, borate, carbonate, citrate and phosphate.

13 Claims, No Drawings

STAIN-BLOCKING AND MILDEWCIDE RESISTANT COATING COMPOSITIONS

BACKGROUND OF THE INVENTION

The present invention relates to the addition of aqueous solutions of zinc ammonium complexes to water based coating compositions to provide a stain-blocking primer composition and to provide a mildewcide and/or biocide resistant coating composition.

In the past, various types of materials have been suggested to be added to water based coating compositions to provide a stain-blocking primer composition. For example, U.S. Pat. No. 3,852,087, disclose the addition of amphoteric compounds, such as, the hydroxides or hydrates of alumina, titania, zirconia, silica or zinc to water based paints to render the tannins insoluble and to prevent their migration through the paint film.

Additionally, U.S. Pat. No. 3,969,293 discloses the use of tribasic zinc phosphites as a substitute for lead in latex paint formulations to provide a pigment which possesses tannin stain-blocking properties and which may possess mildew preventive properties. However, such paint formulations require excessive amounts of zinc oxide in the paint formulations which facilitate cross-linking of the film which causes cracking of the deposited films after extended applications.

Also, U.S. Pat. No. 4,031,055 discloses latex coating compositions containing compounds of zinc which possess improved mildew resistance when such compositions contain isothiazolone type compounds as the mildew controlling material. However, such compositions do not possess stain-blocking properties and do not possess the required long term mildewcide properties of five years and beyond that is required of commercially acceptable coating compositions. Also, the attendant costs associated with the use of large amounts of zinc oxide in such compositions to provide long term mildewcide properties limit the usage of such compositions.

SUMMARY OF THE INVENTION

Accordingly, it is one object of the present invention to provide an novel tannin stain-blocking aqueous coating composition which contains a zinc ammonium complex solution.

It is a further object of the present invention to provide an aqueous coating composition which contains a zinc ammonium complex solution which possess novel biocide properties.

It is still another object of the present invention to provide an aqueous coating composition containing a zinc ammonium complex solution which possess novel mildewcidal properties.

It is yet another object of the present invention to provide a stable aqueous clear resin or polymer coating which contains a predetermine weight percent of the zinc ammonium complex with respect to the resin or polymer portion.

The stain-blocking aqueous coating composition in accordance with the present invention includes a synthetic or natural polymer and an aqueous solution of zinc ammonium complex containing between about 1 to 25 percent by weight of the total weight of the coating composition of a zinc ammonium complex solution. The zinc ammonium complex solution has the formula $$Zn(NH_3)^{+2}_n \cdot X \cdot H_2O$$

where n is a number from 4 to 6 and where X is selected from a group consisting of acetate, borate, carbonate, citrate and phosphate.

A mildewcidal resistant aqueous coating composition in accordance with the present invention includes a synthetic or natural polymer, between about 1 to 25 percent by weight of zinc ammonium complex of the total weight of the coating composition, and a mildewcide between about 0.25 to 5 percent by weight of the total solids weight of the coating composition. Additionally, a biocidal resistant aqueous coating composition in accordance with the present invention includes a synthetic or natural polymer, a zinc ammonium complex solution containing between about 1 to 25 percent by weight of the complex of the total weight of the coating composition, and a biocide of between 0.1 to 3 percent by weight of the total solids weight of the coating composition. The zinc ammonium complex active ingredient has the formula $$Zn(NH_3)^{+2}_n \cdot X \cdot H_2O$$

where n is a number from 4 to 6 and where X is selected from a group consisting of acetate, borate, carbonate, citrate and phosphate.

DETAILED DESCRIPTION

Organic coating resins particularly useful in making aqueous solutions of clear and pigmented paints and other coating compositions in accordance with the present invention are polymers, including homopolymers, copolymers and terpolymers and/or mixtures thereof, (a) acrylic acid esters and methacrylic acid esters having 1–15 carbon atoms specifically, methyl acrylate, ethyl acrylate, butyl acrylate, 2-ethyl hexyl acrylate, methyl methacrylate, ethyl methacrylate, vinyl acetate, ethylene oxide, vinyl chloride, epoxy, and butyl methacrylate (2) vinyl-acrylic acid esters and vinyl methacrylic acid esters and (3) acrylate nitrile, styrene-butadiene co-polymers and polyurethane.

When an aqueous solution of a zinc ammonium complex is added to an organic resinous coating within a predetermined weight percent range of the total weight of the coating, the resultant clear or pigmented primer coating composition when applied to woods, such as Redwood and Cedar, provides a "stain-blocking" action by preventing and substantially reducing the tendency of the tannin stains to migrate or bleed into the subsequently applied paint film top coat. It is believed that the "stain-blocking" action is the result of the zinc ammonium complex transforming or rendering the water soluble tannin stains, which are complex acidic compounds, such as, phenolic and gallic acid derivatives, into insoluble forms.

The stain-blocking aqueous coating composition in accordance with the present invention includes a synthetic or natural polymer and between about 1 to 25 percent by weight of the total weight of the coating composition of a zinc ammonium complex solution. The zinc ammonium complex solution has the formula $$Zn(NH_3)^{+2}_n \cdot X \cdot H_2O$$

where n is a number from 4 to 6 and where X is selected from a group consisting of acetate, borate, carbonate, citrate and phosphate.

In using the word "coating", it is within the scope of the present invention that "coating" includes the addition of the zinc ammonium complex to the resin or polymer portion and includes the addition of the zinc ammonium complex to the composition after the pigment has been dispersed into the resin or polymer. In other words, the resultant coating composition in accordance with the present invention may be clear or pigmented. When the zinc ammonium complex, in the form of an aqueous solution, is added to or incorporated with the resin portion within a predetermined range weight of solids of the aqueous solution, the stability of the resultant clear coating is maintained by adding excess ammonium hydroxide to prevent crystallization. As generally used, the zinc ammonium aqueous complex solution is composed of between about 25–35 percent solids by weight of the total zinc ammonium complex, with a preferred range of about 28–30 weight percent zinc ammonium complex in solution.

A mildewcidal resistant aqueous coating composition in accordance with the present invention includes a synthetic or natural polymer, a zinc ammonium complex solution containing between 1 to 25 percent by weight of the total weight of the coating composition, and, preferably, an organic mildewcide and between about 0.25 to 5 percent by weight of the total solids weight of the coating composition. Additionally, a biocidal resistant aqueous coating composition in accordance with the present invention includes a synthetic or natural polymer, a zinc ammonium complex solution containing between about 1 to 25 percent by weight of the complex of the total weight of the coating composition, and a biocide of between about 0.1 to 3 percent by weight of the total solids weight of the coating composition. The zinc ammonium complex active ingredient has the formula $$Zn(NH_3)^{+2}{}_n \, X.H_2O$$

where n is a number from 4 to 6 and where X is selected from a group consisting of acetate, borate, carbonate, citrate and phosphate.

The zinc ammonium complex is represented by the formula $$Zn(NH_3)^{+2}{}_n \, X.H_2O$$

where n may range in value from 4 to 6 and X may be selected from a group of water soluble salts including acetate, borate, carbonate, citrate and phosphate. Examples of the zinc ammonium carbonate complexes could be represented as $$Zn(NH_3)^{+2}{}_4 \, CO_3.H_2O \text{ or } Zn(NH_3)^{+2}{}_6 \, CO_3 \, .H_2O.$$

The zinc ammonium complex may be prepared using various chemical reactions. The primary consideration is to convert the starting insoluble zinc material into a soluble material or form which is reactive with ammonium hydroxide, ammonia water or amines. For example, the following reactions will provide the zinc ammonium complex.

$$1 \text{ mole } ZnCO_3 + 4 \text{ moles } NH_4OH \rightarrow Zn(NH_3)^{+2}{}_4 \, CO_3.H_2O + 3H_2O(l) \quad (1)$$

or $$1 \text{ mole } ZnO + 1 \text{ mole } NH_4HCO_3 + 5 \text{ moles } NH_4OH \rightarrow Zn(NH_3)^{+2}{}_6 \, CO_3.H_2O + 5H_2O \quad (2)$$

The resultant zinc complex forms when sufficient complexing agent, the ammonium hydroxide, is present in the reaction.

When it is desired to prepare a clear coating composition containing a polymer material or mixture thereof and zinc ammonium complex, it is generally preferred to add the zinc ammonium complex in an aqueous solution to the polymer. However, the aqueous zinc ammonium complex obtained in reactions (1) and (2) above, will yield the solid form of the complex by driving off the water. This solid complex material may then be added to the polymer solution to provide the clear coating composition in accordance with the present invention. In both instances, the stability of the clear coating composition is maintained by adding excess ammonium hydroxide to prevent crystallization with the overall weight percent of the zinc ammonium complex being between about 25 to 35 percent of the total solution.

The amount of synthetic or natural polymer material or mixtures thereof present in the coating composition in accordance with the present invention should be within the range of about 1% up to about 25% by weight of the total weight of the coating composition.

The aqueous coating composition is provided containing a synthetic or natural polymer and a zinc ammonium complex solution comprised of between about 0.25 to 6 percent by weight of the total solid weight of the coating composition, with the zinc ammonium complex having the formula $Zn(NH_3)^{+2}{}_n \, X.H_2O$ where n is a number from 4 to 6 and x is selected from a group consisting of acetate, borate, carbonate, citrate and phosphate.

Additionally, aqueous coating compositions in accordance with the present invention have been found to be particularly effective in providing in can preservative properties which acts as a biocide in preventing bacteria growth in the on the shelf coating compositions. The attendant long term mildewcide resistance of such coating compositions containing zinc complex has resulted in compositions which substantially eliminate the necessity of using expensive zinc oxide in such compositions to provide long term mildewcide resistance. Accordingly, the long term resistance to mildewcides of such compositions containing limited amounts of zinc complexes instead of larger amounts of zinc oxide results in a composition which is substantially less expensive than conventional compositions containing significant amounts of zinc oxides.

When an aqueous solution of the zinc ammonium complex is added to an organic resinous coating containing either an organic mildewcide inhibiting material or an organic bactericide inhibiting material within a predetermined weight percent range of the total weight of the resinous coating, the resultant coating possesses significant mildew, fungus and bacteria resistance over conventional coatings which contain zinc oxide and other zinc derivatives and such organic mildewcide or bactericide inhibiting materials. Such conventional coatings, containing zinc oxide and other zinc derivatives, apparently interfere with the metabolism of bacteria and fungi microorganisms and retard their growth; however, such inorganic mildewcides leach out over time and their effectiveness is diminished, thereby necessitating the use of organic mildewcides and/or bactericides in such compositions. When the coating compositions in accordance with the present invention contain, preferably, an organic bactericide, the bactericide is added in the range of 0.1 to 3 percent by weight of the total weight of the coating composition, with a preferred range of between 0.25 to 1.0 percent by weight. When the coating compositions in accordance with the present invention contain, preferably, an organic mildewcide, the mildewcide is added in the range of 0.25 to 5 percent by weight of the total weight of the coating composition, with a preferred range of between 0.5 to 1.5 percent by weight.

It has been determined that the increased solubility and chemical concentration characteristics of the zinc ammonium complex in the resinous coating produces a 50–70% increased efficiency in retarding mildewcidal activities of the coating in accordance with the present invention over coatings containing zinc oxide and other zinc derivatives and evaluations indicate the complex material enhances the effectiveness of organic mildewcides and organic bactericide in the coating compositions. This increased mildew resistance, it is believed, is due to the increased penetration and rupture of the micro-organism cell wall by the zinc ammonium complex which enhances the efficiency of the zinc oxide and organic mildewcide within the resinous coating composition.

An example of an organic mildewcide useful in the present invention is identified by the trademark SKANE-M8 and is available from the Rohn and Haas Company, Philadelphia, Pa. This chemical is identified as 2-N-Octyl-4-isothiazolin-3-one. The present invention containing the zinc ammonium complex, when containing the organic mildewcide SKANE-M8, will enhance the performance and stability of SKANE-M8 and prevent it from decomposing and generating hydrogen sulfide. Another example of an organic mildewcide useful in the present invention is identified by the trademark POLYPHASE AF-1 and is available from Troy Chemical Corp., Newark, N.J. This chemical is identified as 3-iodo-2-propynyl butyl carbamate. Still another example of an organic mildewcide useful in the present invention is identified by the trademark NOPCO-CIDE N-96 an is available from Henkel Corporation, Ambler, Pa. This chemical is identified as tetrachloroisophthalonitrile.

One example of an organic bactericide useful in the present invention is identified by the trademark KATHON LX and is available from the Rohn and Haas Company. This chemical is identified as 5-chloro-2-methyl-4-isothiazolin-3-one. Still another example of an organic bactericide useful in the present invention is identified by the trademark PROXEL GXL and is available from ICI Americas, Inc., Washington, Del. This chemical is identified as 1,2-benzisothiazolin-3-one.

The following examples of coating compositions are illustrative of the present invention and are given in terms of percentage by weight.

EXAMPLE I

| Component | Based on Total Formula Weight |
| --- | --- |
| Latex Polymer (Solids) | 52.2% |
| Zinc Complex (Solids) | 2.6% |
| Coalescing Solvent | 4.9% |
| Water | 40.3% |
| | 100.0% |

Example I is a clear coating composition which is pigment free and essentially is an aqueous solution of a latex polymer and zinc ammonium complex.

EXAMPLE II

| Component | Based on Total Formula Weight |
| --- | --- |
| Latex Polymer (Solids) | 23.0% |
| Zinc Complex (Solids) | 1.2% |
| Titanium Dioxide | 13.5% |

-continued

| Component | Based on Total Formula Weight |
| --- | --- |
| *Calcium Carbonate | 13.7% |
| Additives | 1.4% |
| Coalescing Solvent | 2.1% |
| Glyrols | 2.5% |
| Water | 42.6% |
| | 100.0% |

Example II is a pigmented coating composition. The calcium carbonate is used in this example primarily for economic reasons. Other extenders, such as aluminum silicate, magnesium silicate, mica, and/or silica could be used with the present invention without significantly effecting the performance of the disclosed invention.

Bactericide Test

Various bacterial strains commonly encountered in paint production were inoculated on agar culture plates. Pigmented compositions containing specific commercial available organic biocides, pigmented compositions containing either zinc complex borate or zinc complex citrate and pigmented compositions containing zinc ammonium complex and commercially available organic biocides were then smeared on the inoculated culture plates. Samples containing zinc oxide but with no organic biocide or zinc complex was used as the controls. The inoculated culture plates were incubated for one month and the growth pattern of the bacterial colonies observed and measured. The zinc complex containing sample produced a 50 to 70 percent reduction in the growth of bacteria over the control sample containing zinc oxide and produced a 20 to 30 percent reduction in the growth of bacteria over the compositions containing commercially available organic biocides or bactericides.

Mildewcide Test

Pigmented compositions containing various concentrations and combinations of the zinc complex salts, containing organic mildewcides and free of organic mildewcides, were applied on clear white pine panels and mounted for exterior exposure at South Bend, Indiana and on the Florida coast. Control samples containing zinc oxide and other zinc derivatives were applied onto the clear white pine panels. The panels were observed and measured to determine mildew growth after a three year period. The test panels containing the film composition containing the zinc complexes exhibited superior mildewcide properties over the control samples of zinc oxide and other zinc derivatives, while at the same time eliminating the use of expensive zinc oxide in such compositions. The zinc complex compositions, when used with SKANE-M8 mildewcide, prevented the release of hydrogen sulfide over the three year period and prolonged the mildewcide resistant of the coated panels. It was observed that 50 to 75% less by weight zinc complex as compared to the weight percent of zinc oxide provided the same mildewcide resistance as a control sample containing zinc oxide. Moreover, the control samples containing zinc oxide produced films which evidenced cracking of the film due to zinc oxide cross-linking the resin polymer. The observed data indicates that the zinc complex provides long term mildewcide resistance of five years and beyond and that although control samples containing zinc oxide provide long term mildewcide resistance, the zinc oxide may be replaced by zinc complex in the range of about 3 to 40% weight per cent zinc complex as compared to the weight percent of zinc oxide to provide the novel mildewcide resistance in accordance with the present invention, with a preferred range of about 5 to 10 weight percent zinc complex as compared to the weight percent of zinc oxide. The range by weight of the zinc ammonium complex was between about 0.25 to 6 percent by weight of the total solid weight of the pigmented composition. However, the resultant coating may contain some amounts of zinc oxide which may assist in providing long term mildewcidal properties to the coating.

Stain Blocking Tests

A coating compositions of both clear and pigmented compositions containing zinc complex were applied over wood panels possessing various stain characteristics, such as, Redwood and Cedar tannin stains, charred wood and water stains to simulate fire damage and ink and crayon marker stains to simulate graffiti damage. The clear coating compositions and pigmented compositions, all containing the zinc complex was applied at 6 mils wet film thickness over the panels and a white top-coat, free of zinc complex, was applied having 6 mils wet film thickness over the primer composition. Primers free of zinc complex and primers containing commercial stain-blockers, such as, tribasic zinc phosphites, were utilized as the control samples. The coatings containing zinc complex effectively blocked and prevented migration of the tannin, charred wood, and graffiti stains into the top-coat film and maintained a whiteness on the wood panels that compared to the whiteness when the top-coat was initially applied to the wood panels. The clear coating composition effectively blocked and prevented migration of the tannin, charred wood, and graffiti stains through the clear film coating. The control samples did not prevent the tannin, charred wood and graffiti stains from migrating into the applied top-coat. The range by weight of the zinc ammonium complex was between 1 to 25 percent by weight of the total weight of the coating composition.

I claim:

1. A tannin stain-blocking aqueous coating composition for precipitating tannin stains containing a synthetic or natural polymer and a zinc ammonium complex solution, with said zinc ammonium complex solution being present in an amount of between about 1 to 25 percent by weight of the total weight of the coating composition and having a formula $Zn(NH_3)^{2+}_n \cdot X \cdot H_2O$ where n is a number from 4 to 6 and where X is selected from the group consisting of acetate, borate, carbonate, citrate, and phosphate, with said zinc ammonium complex precipitating said tannin stains thereby rendering said tannin stains insoluble.

2. The stain-blocking aqueous coating composition in accordance with claim 1 wherein the synthetic polymer is selected from the group consisting of acrylic acid esters, epoxy, vinyl-acrylic acid esters, styrene-butadiene co-polymers, acrylate-nitrile co-polymers and polyurethane.

3. The stain-blocking aqueous coating composition in accordance with claim 1 wherein the zinc ammonium complex solution is present in an amount of between about 5 to 10 percent by weight of the total weight of the coating composition.

4. The stain-blocking aqueous coating composition in accordance with claim 1 further containing a pigment.

5. The stain-blocking aqueous coating composition in accordance with claim 4 wherein said pigment is selected from the group consisting of titanium dioxide, zinc oxide and extender pigments.

6. The stain-blocking aqueous coating composition in accordance with claim 1 further containing a bactericide in an amount of between 0.1 to 3.0 percent by weight of the total weight of the composition.

7. The stain-blocking aqueous coating composition in accordance with claim 6 wherein said bactericide is selected from the group consisting of 5-chloro-2-methyl-4-isothiazolin-3-one and 1, 2-benzisothiazolin-3-one.

8. The stain-blocking aqueous coating composition in accordance with claim 7 wherein said bactericide is present in an amount of between about 0.25 to 1.0 percent by weight of the total weight of the composition.

9. The stain-blocking aqueous coating composition in accordance with claim 1 further containing a mildewcide in an amount of between 0.25 to 5.0 percent by weight of the total weight of the coating composition.

10. The stain-blocking aqueous coating composition in accordance with claim 9 wherein said mildewcide is selected from the group consisting of 2-N-octyl-4-isothiazolin-3-one, 3-iodo-2-propynyl butyl carbamate and tetrachloroisophthalonitrile.

11. The stain-blocking aqueous coating composition in accordance with claim 10 wherein said mildewcide is present in an amount of between 0.5 to 1.5 percent by weight of the total weight of the composition.

12. The stain-blocking aqueous coating composition in accordance with claim 1 wherein said zinc ammonium complex solution contains between about 25 to 35 percent solids by weight of the zinc ammonium complex.

13. The stain-blocking aqueous coating composition in accordance with claim 12 wherein said zinc ammonium complex solution contains 28 percent solids by weight of the zinc ammonium complex.

* * * * *